United States Patent [19]
Heslinga et al.

[11] 3,957,908
[45] May 18, 1976

[54] DEGRADABLE PLASTICS COMPRISING A MIXTURE OF A STYRENE-MALEIC ANHYDRIDE COPOLYMER, POLYVINYL ACETATE AND AN ESTER OF A HEMIFORMAL

[75] Inventors: Adolf Heslinga, Pijnacker; Petrus Jan Napjus, Delft, both of Netherlands

[73] Assignee: Nederlandse Organisatie voor Toegapast Natuurwetenschappellik Underzoek Ten Benoeve, The Hague, Netherlands

[22] Filed: Jan. 31, 1975

[21] Appl. No.: 545,966

[30] Foreign Application Priority Data
Feb. 18, 1974 Netherlands.................. 7402178

[52] U.S. Cl............................. 260/874; 260/31.4 R; 260/DIG. 43; 428/913
[51] Int. Cl.²......................................... C08L 33/02
[58] Field of Search........ 260/DIG. 43, 874, 31.4 R; 220/DIG. 30; 128/284; 428/913

[56] References Cited
UNITED STATES PATENTS

| | | |
|---|---|---|
| 3,462,342 | 8/1969 | Cooper et al....................... 260/874 |
| 3,615,419 | 10/1971 | Field.................................. 260/874 |
| 3,616,797 | 11/1971 | Champaigne, Jr. et al......... 128/284 |
| 3,670,731 | 6/1972 | Harmon............................. 128/284 |
| 3,695,269 | 10/1972 | Malaney............................ 128/284 |
| 3,697,466 | 10/1972 | Sullivan et al..................... 260/874 |
| 3,762,454 | 10/1973 | Wilkins, Jr........................ 428/913 |

Primary Examiner—Eugene C. Rzucidlo
Attorney, Agent, or Firm—Brumbaugh, Graves, Donohue & Raymond

[57] ABSTRACT

Water-degradable synthetic resin compositions substantially composed of a 3-component mixture of a. one or more copolymers of an alkenic unsaturated monomer and maleic anhydride b. one or more hydrophilic polymers of vinyl esters of lower aliphatic monocarboxylic acids and/or copolymers thereof with other vinyl monomers and c. one or more compounds having the general formula $(R)OCH_2OCO(R')$. The compounds are mixed by dissolving them in a solvent and the foils or articles are produced therefrom.

7 Claims, No Drawings

DEGRADABLE PLASTICS COMPRISING A MIXTURE OF A STYRENE-MALEIC ANHYDRIDE COPOLYMER, POLYVINYL ACETATE AND AN ESTER OF A HEMIFORMAL

BACKGROUND OF THE INVENTION

The invention relates to artificial resin materials degradable under the influence of water, as well as throwaway packaging materials, such as film, wrappings, cups, bottles, trays, boxes and the like, which usually are used for the packaging of consumer goods, such as foodstuffs, groceries and household articles in general.

As is known, because of the increasing use of plastic packaging materials that subsequently are thrown away, serious problems of pollution and waste have arisen because most plastic materials that are used for packagings, have a long service life in the open air and consequently when thrown away or piled on dumping-grounds for household refuse, are degraded to a very small extent.

A solution for these problems of pollution and waste can, of course, be found by using plastic materials for packaging purposes that, when they are thrown away or dumped on dumping-grounds, are degraded and start forming a part of the soil by the action of water, rainfall, moisture, wind erosion or biochemical processes and in a harmless form are incorporated in the natural environment. Against this desired degradation of the plastic materials the need should be weighed, however, that the durability of the material is preserved under normal conditions of processing and storage and that the degradation proceeds gradually, so that use in packaging is possible.

In prior art Netherlands patent application 71 05713 it has been proposed to prepare polymeric packaging materials that degrade under the influence of the ultraviolet light of the sun, but indoors have an unlimited service life if they do not come into contact with direct sunlight. A drawback of these polymeric packaging materials is, however, that the problem of degradation when they are dumped on dumping-grounds and refuse dumps is not sufficiently solved, since in such cases they are not exposed to to sunlight.

OBJECTS OF THE INVENTION

It is the object of the invention to provide plastic materials, suitable for the manufacture of packaging materials, which degrade under the influence of water but under other conditions do not deteriorate perceptibly in quality. On storage and use indoors they have a substantially unlimited service life. Besides and simultaneously with the said hydrolytic degradation of the plastic materials according to the invention there will also take place slowly proceeding secondary oxidative and other kinds of processes, i.a. by chain degradation of the polymers, low molecular products being produced that eventually by biochemical attack can be degraded to carbon dioxide and water, in accordance with the natural degradation of vegetable or animal materials

SUMMARY OF THE INVENTION

According to the invention the method for the preparation of plastic materials degradable under the influence of water is characterized in that a composition of polymers is prepared that mainly consists of (a) one or more copolymers of an alkenic unsaturated monomer and maleic acid anhydride, (b) one or more polymers of vinyl esters of lower aliphatic monocarboxylic acids and/or copolymers of them with other vinyl monomers and (c) one or more compounds, having the general formula

in which R represents an uni- or polyvalent alkyl or aralkylhydroxy radical and R' an uni- or polyvalent alkyl, aryl, aralkyl or alkarylcarboxyl radical.

GENERAL CONSIDERATIONS OF THE INVENTION

Compositions of polymers according to the invention can be used for the manufacture of packaging materials that are excellently suitable as throw-away packagings, because the material when dumped on dumping-grounds and refuse dumps, under the influence of water, moisture and air gradually degrades into products harmless to the natural environment and that do not disturb the ecological balance. In so doing, the whole process in general lines proceeds in three phases, in the first phase, which normally takes three days, a swelling and hydrolysis of the polymeric material occurrs and a water-soluble substance is formed. In the second phase, in a space of time of some weeks to some months, further hydrolysis and also oxidation takes place, depolymerization of the high molecular products occurring. Finally, in the third phase, which can extend over a period of some years, the degradation by biochemical influences (microflora, bacteria, etc.) into the "natural" products acetic acid and other organic acids, carbon dioxide and water takes place.

The copolymers of alkenic unsaturated monomers and maleic acid anhydride incorporated as component (a) in the compositions of polymers according to the invention are the main component of the latter. Preferably, such a copolymer of styrene and maleic acid anhydride is used, which product has already been known for a long time and has been extensively described in the literature (see e.g. R. H. Boundy, "Styrene, its polymers, Copolymers and Derivatives," Reinhold Publishing Corporation, New York, 1952, pp.860–865 and "Encyclopedia of Polymer Science and Technology", Interscience Publishers, New York, Vol. 1, pp.81.–85. This copolymer has a highly polar character but is insoluble in water, however. Under the influence of water it changes, however, dependent on conditions of pH and temperature, into a polymer that is soluble in water because free carboxylic groups or carboxylate ions are formed. Use is made of this property, e.g. when this copolymer is applied as a thickener in aqueous solutions and as a soil-improving agent. For use as a plastic material in manufacturing films and the like this copolymer has been found unsuitable so far because of bad mechanical properties (much too brittle at ambient temperature) and because the moisture sensitivity is too high, particularly in the pH range >7.

It was found now, however, that the copolymer of styrene and maleic acid anhydride, as a result of the combination with components (b) and (c) according to the invention, as a composition of polymers with desired mechanical properties, such as flexibility, impact resistance, tensile strength and the like, can be made excellently useful, while retaining its water or moisture sensitivity, so that a hydrolytic degradation can occur into a water-soluble product. Moreover, the sensitivity to water of the total composition of polymers can be controlled by means of the mutual ratios of the composing components (a), (b) and (c).

It is surprising that the desired mechanical properties are rendered permanent to the copolymer of styrene and maleic acid anhydride only, if a combination of both components (b) and (c) is added to it. When adding only component (c), it is true that initially an improvement in the mechanical properties is attained, but it is not of a permanent nature. On the other hand the addition of this component (c) is necessary, though, in order to attain the desired water-sensitivity of the combination of polymers, since when only component (b) is added a permanent improvement in the mechanical properties is attained, but the water-sensitivity decreases.

Of the polymers of vinyl esters of lower aliphatic mono carboxylic acids incorporated as component (b) in the compositions of polymers according to the invention, polyvinylacetate is preferably used. On this product, which has versatile uses, there is comprehensive literature (see, for instance, "Encyclopedia of Polymer Science and Technology", Interscience Publishers, New York, Vol. 15, pp. 577–663). Like the copolymer of styrene and maleic acid anhydride the polymer has a highly polar character. In mechanical properties it differs considerably, however, from the last-mentioned copolymer, because the former is of a plastic or rubbery character. For use in the invention the polyvinylacetate should have a sufficiently high molecular weight, i.e., of at least 200,000. Under certain conditions this polyvinylacetate can be mixed in all proportions with the copolymer of styrene and maleic acid anhydride used as component (a). As has been said previously, by adding polyvinylacetate to the copolymer of styrene and maleic acid anhydride, the mechanical properties of the latter product are considerably and permanently improved, enabling the processing and application as a synthetic resin material for packaging purposes and the like.

The compounds, having the general formula

and incorporated as component (c) in the compositions of polymers according to the invention, can be considered as esters of the so-called hemiformals, i.e., the primary addition products of alkanols to formaldehyde, having the formula

ROCH$_2$OH.

Since hemiformals as such cannot be isolated, for the preparation of the present esters, one cannot start directly from these hemiformals, but other methods should be followed for their preparation that are known per se. As suitable methods of preparation i.a. may be mentioned: 1. Conversion, with alkali or alkaline earth salts of monocarboxylic acids, of α-halogen ethers obtained by reaction of formaldehyde with alkanols and halogen hydride according to the reaction equations:

ROH + HCHO + HX → ROCH$_2$X + H$_2$O

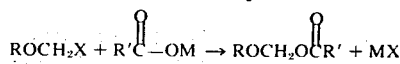

(see F. E. Clark, J.Am.Chem.Soc.39, 712 (1917). 2. Conversion of cyclic formals, obtained by reaction of formaldehyde with diols, with acid anhydrides according to the reaction equations:

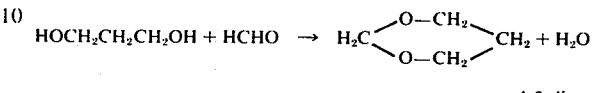

1,3 dioxane

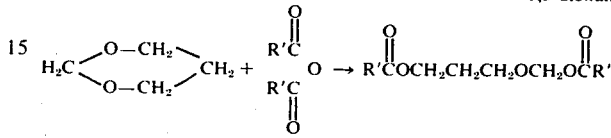

(see United States patent 2,416,024)

Consequently in this reaction, compounds are produced, which, besides the characteristic oxymethylene ester group, also contain a "normal" ester group.

Characteristics for the compounds, having the general formula

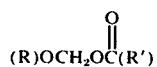

include their easy hydrolyzability with water, the original starting products being formed again according to the reaction equation:

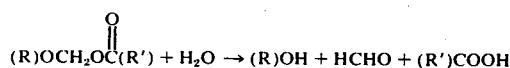

In contrast with the hydrolysis of "normal" esters, for which mostly highly acidic or basic reaction conditions and high temperatures are required, the hydrolysis of the oxymethylene esters proceeds easily with water, having a pH=7 and at ambient temperature. Use is made of this property with advantage when these compounds are applied in the combinations of polymers according to the invention. Moreover, it was surprising that the addition of these compounds did not cause a perceptible deterioration of the mechanical properties of the compositions of the synthetic resins, provided that, in choosing the suitable compounds a number of factors is taken into account, being related to i.a. the volatility, the compatibility in mixing the components (a) and (b) and the hydrolysis rate at neutral pH. It has been found that when the compounds are correctly chosen, component (c) can be incorporated in the compositions of polymers in an amount, varying between 5 to 50 per cent by weight, calculated on the total weight of the composition of polymers.

With a view to the choice of the compounds according to the invention to be applied as component (c), furthermore their availability plays a part, their cost, the availability of the raw materials and the like to be used for their preparation, as well as the innocuity of their decomposition products for the environment.

In the compounds having the formula

both radicals R and radical R' may be derived from univalent as well as from polyvalent hydroxy and carboxyl compounds, respectively. That is, radical R is an alkyl or aralkyl compound, having 1, 2, 3 or more hydroxy groups in the molecule and radical R' is an alkyl, aryl, aralkyl or alkaryl compound, having 1, 2, 3 or more carboxyl groups in the molecule. Basically, compounds are possible, in which both R and R' are univalent compounds; compounds in which R is a univalent compound and R' is a polyvalent compound; compounds in which R is a polyvalent compound and R' is a univalent compound; and compounds in which both R and R' are polyvalent compounds. The compounds of the first-mentioned type, i.e., those in which R is an alkanol or aralkanol and R' is an alkyl, aryl, aralkyl or alkaryl monocarboxylic acid group, generally are less eligible for application in the combinations of polymers according to the invention because either their boiling-point is too low, or their miscibility with both other components (a) and (b) is not as good. Consequently, compounds of the last-mentioned three types are preferred, in which either R, or R', or both, have been derived from polyvalent compounds.

As examples of compounds which radical R in the above formula may represent, can be mentioned i.a. methanol, ethanol, n-propanol, n-butanol, glycols, glycerol, pentaerythritol and sorbitol. Examples of carboxyl compounds which radical R' may represent, are i.a. formic acid, acetic acid, propionic acid, malonic acid, succinic acid, adipic acid, benzoic acid and phthalic acid.

The compositions of polymers prepared according to the method of the invention can be processed into degradable plastic materials according to techniques known in the art. Thus, from their solutions in volatile organic solvents, films of various thicknesses can be manufactured. These films can also be manufactured according to the usual blow-moulding method if a suitable range of ratios of the 3 compounds is chosen. The compositions of polymers of the present invention can also be processed into moulded products by means of rolling, extrusion, injection moulding, vacuum forming and the like.

As it is known in this field (see US Patent specification 3,536,461) the copolymers of the type (a) as further above defined can be modified with small amounts — e.g. some percentages by weight — of a higher monofunctional alcohol having at least 12 carbon atoms, e.g. a fatty alcohol such as stearyl alcohol. This may be of advantage as regards the workability of the three-component mixture of the present invention as well as regards the mechanical properties of the products obtained.

The plastic material thus obtained is clear, transparent and colorless. Its mechanical properties, such as elasticity, tensile strength, flexibility and the like can be adapted for specific applications by varying nature and mutual ratios of components (a), (b) and (c). Filling agents, dyes or pigments and other additives can be added to the combination of polymers before or during processing. Compositions of polymers according to the invention can also be mixed with other polymers and/or resins. The plastic material obtained from the compositions of polymers is resistant to hydrocarbons, higher alkanols, fats and oils.

As has been stated already, the degradation process of the plastic materials manufactured according to the invention, in outline proceeds in three phases. Upon closer observation of the whole process it has been found that in the first of these phases hydrolysis of component (c) of the composition of polymers takes place, water-soluble degradation products being formed, viz. alcohols, formaldehyde and carboxylic acids. In this process, the formation of carboxylic acids is of great importance, since these contribute to the prevention of too rapid an attack on the whole material. For the hydrolysis of component (a) of the composition of polymers depends on the pH and in particular takes place quickly in the alkaline range. Thus, because of the formation of the carboxylic acids from the hydrolysis of component (c), now a certain extent of stabilization of the material against too rapid a degradation and its subsequent loss of strength occurs. This is particularly importance when the plastic material is used in bats for household refuse for which strength preservation during a period of some days is very important.

Only after component (c) has decomposed entirely and the acid formed in the process has been neutralized, does the second phase of the accelerated degradation set in. In this phase component (a) is slowly hydrolyzed into water-soluble polymeric products and component (b) is slowly degraded and hydrolyzed into polyvinyl alcohol. It is known from literature that both the styrene-maleic acid anhydride copolymer and polyvinyl alcohol can be applied as soil-improving agents. So, both products are innocuous for the environment and even can contribute to improvement of composting techniques.

Finally, in the third phase of the degradation process both polymeric products will be degraded oxidatively and hydrolytically into low molecular weight compounds, which thereupon finally will be converted by microorganisms into carbon dioxide and waater. It is important, however, that after some weeks to some months have passed, the original plastic materials in the soil or in dumping-grounds have been converted into decomposition products that are innocuous for the environment and finally into water-soluble decomposition products.

DESCRIPTION OF PREFERRED EMBODIMENTS

The invention is further elucidated with some embodiments in the following examples.

EXAMPLE I

Preparation of styrene-maleic acid anhydride copolymer 208 gs. of styrene (2 mol) and 196 gs. of maleic acid anhydride were dissolved in 1600 gs. of 2-butanone, whereafter as catalyst 0.5 gs. of azo-bis-isobutyronitrile was added. The mixture was completely polymerized in a nitrogen atmosphere in a period of approx. 4 hours, while being stirred and heated at approx. 70°–80°C. The dry, solid polymer could be obtained from the solution as a white powdery substance with a melting-point above 200°C by precipitating with methanol, filtering off, rinsing out with methanol and drying.

EXAMPLE II

A. Preparation of tetramethylene-bis (oxymethylene acetate) $CH_3\text{-}COO\text{-}CH_2O\text{-}CH_2CH_2CH_2CH_2\text{-}OCH_2OOCCH_3$. To a reaction vessel of 1 L capacity, provided with a stirrer, thermometer and reflux-condenser, were added 200 gs. of acetic anhydride and then 100 gs. (1.2 mol) of anhydrous sodium acetate were suspended therein. Then 93.5 gs. (0.5 mol) of tetramethylene-bis-(chloro methylether) were added, and a rise in temperature of approx. 10°C. occurred. Next, the mixture, while being stirred, was heated for 1 hour at 100°C. The sodium chloride produced was filtered off after cooling and rinsed with two portions of approx. 50 mls. of ether each. From the filtrate and the washing liquid collected, firstly the acetic acid anhydride and the ether were removed under reduced pressure, whereupon the remaining product was subjected to fractional distillation at a pressure of 0.9 mm. After first runnings, which were stripped off at 117°-120°C/0.9 mm (approx. 10 gs.) the desired product was distilled over at 120°–122°C/0.9 mm, while 13 gs. of residue were obtained. Yield approx. 79 gs. (68%), $n_D^{22} = 1.4306$; $d_{21} = 1.098$.

B. Preparation of pentaerythritol-bis (oxmethylene acetate)-bis

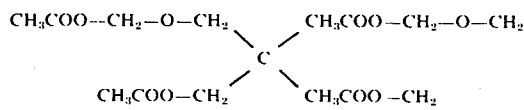

(acetate).

To 160 gs. (1 mol) of molten pentaerythritol-bis(formal) were slowly added, while the solution was being stirred at 70°–80°C, a mixture of 1 gram of concentrated sulphuric acid and 255 gs. (2.5 mol) of acetic acid anhydride. By cooling, the temperature of the reaction mixture was maintained at approx. 70°C for a period of approx. 3 hours, whereupon a quantity of 2 to 3 gs. of sodium acetate were added to neutralize the sulphuric acid.

The excess of acetic acid anhydride (0.5 mol) was then distilled off at a pressure of 15 mm. and after impurities had been distilled off the product was distilled in vacuum. The ester was obtained in a yield of 98–100%. Boiling-point 157°C/0.02 mm. $n_D^{23} = 1.4452$. Ester equivalent weight = 90.8 (theoretically 91.0).

In an analoguous way the pentaerythritol-bis(oxmethylene propionate)-bis (propionate) was prepared by reaction with propionic acid anhydride.

EXAMPLE III

A solution of styrene-maleic acid anhydride copolymer in 2-butanone, as obtained according to Example I, was mixed with a solution of approx. 20 per cent by weight of commercially available polyvinyl acetate (trade name MOWILITH M 70, supplier Farbwerke Hoechst A. G.) in 2-butanone. The average molecular weight of this polymer amounts to approx. $1 \times 10^6$. The two solutions were mixed with each other in such quantities that the mixture contained equal quantities by weight of the polymers.

To separate amounts of the mixture, quantities were added of the compounds prepared according to Example II, and varying from 5 to 50 per cent by weight, based on the total weight of the combination of polymers.

From the viscous solutions thus obtained plastic films were manufactured, varying in thickness from 10 $\mu$ to 500 $\mu$, by casting on a glass sheet and subsequent evaporation of the solvent. By stretching these films, their mechanical properties could even be improved.

Of three samples of the films manufactured by casting, having a thickness of approx. 0.1 mm, some mechanical properties were determined by means of a tensile test. For this purpose, strips, having a width of 1.5 cm were longitudinally cut out of the films, which were kept for two months at ambient temperature and normal degree of humidity. The length at the start of the tensile test amounted to 10 cm and the drawing rate was 5 cm/min. Samples 1 and 2 were taken from films, manufactured from a mixture with approx. 25 per cent. by weight of pentaerythritol-bis(oxmethylene acetate)-bis and sample 3 from film, manufactured from a mixture with approx. 30 per cent by weight of this compound. For comparison, as sample 4 a commercially available polyethylene film of the same thickness was subjected to the same tensile test. The results are given in the following table:

| sample | yield stress kg/cm² | | strength at fracture kg/cm² | | E-modulus kg/cm² | | elongation at break kg/cm² | |
|---|---|---|---|---|---|---|---|---|
| | avg. | dev. f.* strength | avg. | dev. f.* strength | avg. | dev. f.* strength | avg. | dev. f.* strength |
| 1 | 189 | 13 | 145 | 13 | 7500 | 700 | 105 | 40 |
| 2 | 205 | 21 | 174 | 18 | 8500 | 1300 | 110 | 70 |
| 3 | 146 | 9 | 168 | 14 | 6000 | 1000 | 160 | 18 |
| 4 | 119 | 3 | 151 | 14 | 2400 | 350 | 400 | 70 |

*standard deviation

EXAMPLE IV

With samples of the casting-films manufactured according to Example III and consisting of equal parts by weight of styrene-maleic acid anhydride copolymer and polyvinyl acetate and 25% by weight of pentaerythritol-bis (oxmethylene acetate)-bis(acetate), and another film having he same composition but made with the corresponding propionate compound, respectively, the following tests were carried out to demonstrate their sensitivity to water. The thickness of the films was 80–100 $\mu$:

A. Accelerated degradation in water with phosphate buffer at pH=8 and a temperature of 80°C Some strips of the films were kept in continuous contact with the hot water. After a certain period of time the los of weight was determined andhe progress of the attack was plotted graphically as a function of time.

From the tests it was found that after approx. 15–20 minutes the pentaerythritol-bis(oxmethylene acetate)-bis(acetate) had substantially disappeared from the film by hydrolysis and solvation in water. This manifested itself i.a. by loss of mechanical strength (becoming brittle) of the dried material.

After approx. 14–15 hours the styrene-maleic acid anhydride copolymer had also dissolved entirely and a fleecy, shapeless substance was left, mainly consisting of highly swollen polyvinyl acetate.

From infrared-analysis results it appeared that saponification was beginning in this residue.

The samples with pentaerythritol-bis(oxmethylene propionate)-bis(propionate) showed an approximately twofold decrease in degradation rate of the film.

B. Degradation in water at pH=6-7 and a temperature of 15°–20°C

Strips of the films were suspended in test tubes, filled with water. After 24 hours a slight turbidity and a slight swelling of the film occurred. After 3 to 5 days component (c) had, dependent on the thickness of the film, substantially disappeared from the film and the swelling started to increase at an accelerated rate, the strength of the material decreasing at a slow pace. After 2–3 weeks had elapsed, component (a) had disappeared and a soft fleece of polyvinyl acetate remained. In this test it was also found that the degradation of the film in which as component (c) the propionate compound had been incorporated proceeds more slowly (by a factor 1.5–2).

After some months fungoid growth was found in the water, which indicates to a biochemical conversion of the decomposition products.

C. Degradation in alkaline aqueous solution at pH>9 and ambient temperature

Upon introducing strips of the films into solutions of ammonia, sodium hydroxide, soda and organic amines, at ambient temperature a very strong swelling and a fast degradation were found. Already after some hours the total degradation had reached an advanced stage.

D. Degradation on burying

On burying films it was found that these had substantially lost their mechanical strength after some weeks and that the material disintegrated. The temperature, humidity, pH and thickness of the film were the most important factors influencing the degradation.

Upon burying in a mass of vegetable compost that became overheated (temperature approx. 70°C), after a week had elapsed, only with difficulty could residues of the film be retrieved.

We claim:

1. A composition of polymers degradable under the influence of water consisting essentially of a mixture of (a) one or more copolymers of an alkenic unsaturated monomer and maleic acid anhydride, (b) one or more copolymers of vinyl esters of lower aliphatic monocarboxylic acids and/or copolymers thereof with other vinyl monomers, and 5 to 50 percent by weight calculated on the total composition, of (c) one or more compounds having the general formula

in which R represents a radical derived from a uni- or polyvalent alkyl or aralkylhydroxyl compound and R' is a radical derived from a uni- or polyvalent alkyl, aryl, aralkyl or alkarylcarboxyl compound.

2. A composition according to claim 1, wherein component (a) is a copolymer of styrene and maleic acid anhydride.

3. A composition according to claim 1, wherein component (b) is polyvinyl acetate having a molecular weight of at least 200,000.

4. A composition according to claim 1, wherein component (c) is present in the composition in amounts of between 20 and 50% by weight.

5. A composition according to claim 1, in which in component (c) either R or R', or R and R' both, being a radical derived from polyvalent hydroxyl, carboxyl compounds, respectively.

6. A composition according to claim 4, wherein as component (c) tetra methylene-bis (oximethylene acetate) or pentaerythritol-bis (oximethylene acetate)-bis-(acetate is used.

7. Shaped articles of plastic materials produced from a composition according to claim 1.

* * * * *

UNITED STATES PATENT AND TRADEMARK OFFICE
CERTIFICATE OF CORRECTION

PATENT NO. : 3,957,908
DATED : May 18, 1976
INVENTOR(S) : Adolf Heslinga & Petrus Jan Napjus It is certified that error appears in the above-identified patent and that said Letters Patent are hereby corrected as shown below:

[73] Assignee: "Nederlandse Organisatie voor Toegapast Natuurwetenschappellik Underzoek Ten Benoeve" should be -- Nederlandse Organisatie voor Toegepast-Natuurwetenschappelijk Onderzoek Ten Behoeve Van Nijverheid, Handel en Verkeer --;

Col. 2, after line 5, the formula "(R)OCH2OC(R')" should read -- $(R)OCH_2O\overset{O}{\underset{\|}{C}}(R')$ --;

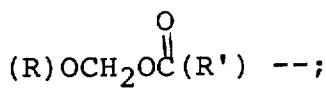

Col. 6, line 23, "bats" should be -- bags --;
Col. 6, line 43, "waater" should be -- water --;
Col. 7, line 25, "oxmethylene" should be -- oxymethylene --;
Col. 8, line 29, "oxmethylene" should be -- oxymethylene --;
Col. 8, line 55, "oxmethylene" should be -- oxymethylene --;
Col. 8, line 66, "los" should be -- loss --;
Col. 9, line 2, "oxmethylene" should be -- oxymethylene --;
Col. 9, line 13, "oxmethylene" should be -- oxymethylene --;
Col. 10, Claim 6, line 4, "(acetate" should be -- (acetate) --.

Signed and Sealed this

Third Day of May 1977

[SEAL]

Attest:

RUTH C. MASON
Attesting Officer

C. MARSHALL DANN
Commissioner of Patents and Trademarks